(12) United States Patent
Olim

(10) Patent No.: US 6,735,036 B1
(45) Date of Patent: May 11, 2004

(54) CONTROL OF DATA SENSOR FLY HEIGHT

(75) Inventor: Moshe Olim, Eden Prairie, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/532,927

(22) Filed: Mar. 22, 2000

Related U.S. Application Data

(60) Provisional application No. 60/176,519, filed on Jan. 13, 2000.

(51) Int. Cl.$^7$ .............................. G11B 21/02
(52) U.S. Cl. ................ 360/75; 360/78.11; 360/78.12
(58) Field of Search ................. 360/75, 78.11, 360/78.12, 294.7, 244.2, 245.3, 274

(56) References Cited

U.S. PATENT DOCUMENTS

| | | | | |
|---|---|---|---|---|
| 3,852,820 A | * | 12/1974 | Barbeau et al. | 360/98.03 |
| 4,414,592 A | | 11/1983 | Losee et al. | |
| 4,605,977 A | * | 8/1986 | Matthews | 360/234.7 |
| 4,853,810 A | | 8/1989 | Pohl et al. | |
| 5,021,906 A | | 6/1991 | Chang et al. | 360/103 |
| 5,128,822 A | * | 7/1992 | Chapin et al. | 360/236.3 |
| 5,276,573 A | * | 1/1994 | Harada et al. | 360/235.3 |
| 5,313,352 A | | 5/1994 | Chikazaw et al. | 360/103 |
| 5,446,612 A | * | 8/1995 | Thornton et al. | 360/244.9 |
| 5,764,432 A | | 6/1998 | Kasahara | 360/75 |
| 5,856,896 A | | 1/1999 | Berg et al. | 360/104 |
| 5,898,541 A | | 4/1999 | Boutaghou et al. | 360/109 |
| 5,907,090 A | * | 5/1999 | Gunderson | 73/9 |
| 5,943,189 A | | 8/1999 | Boutaghou et al. | 360/103 |
| 5,943,761 A | | 8/1999 | Tucker et al. | |
| 5,959,806 A | | 9/1999 | Leung | |
| 5,991,114 A | | 11/1999 | Huang et al. | 360/75 |
| 6,030,179 A | * | 2/2000 | McCabe | 416/237 |
| 6,032,262 A | * | 2/2000 | Alonso et al. | 714/1 |
| 6,226,933 B1 | * | 5/2001 | Nelson et al. | 52/101 |
| 6,308,689 B1 | * | 10/2001 | Augustin | 123/506 |
| 6,344,949 B1 | * | 2/2002 | Albrecht et al. | 360/236.5 |
| 6,359,759 B1 | * | 3/2002 | Congdon et al. | 360/294.7 |
| 6,381,101 B1 | * | 4/2002 | Mohajerani et al. | 360/254.7 |
| 6,473,259 B1 | * | 10/2002 | Kuo et al. | 360/75 |

* cited by examiner

*Primary Examiner*—David Hudspeth
*Assistant Examiner*—Jason Olson

(57) ABSTRACT

A data storage device includes a head suspension assembly having an attached airfoil. The airfoil is coupled to an active (i.e., movable) element that responds to signals from height control circuitry. A method of controlling a height of an air bearing surface includes positioning a suspension assembly having an airfoil and an air bearing disk head over a surface of a rotating data storage disk. A position (e.g., an angle) of the airfoil can then be dynamically altered to change a distance of the disk head perpendicular to the surface of the disk.

26 Claims, 6 Drawing Sheets

CONTROL OF DATA SENSOR FLY HEIGHT

CROSS-REFERENCE(S) TO RELATED APPLICATIONS

This application claims the benefit of the filing date of U.S. provisional application Ser. No. 60/176,519 entitled "A Device For Dynamic Control Of Air Bearing Fly Height" which was filed on Jan. 13, 2000.

BACKGROUND OF THE INVENTION

Disk drives are information storage devices that use thin film magnetic media to store data. A typical disk drive includes one or more rotating disk having concentric data tracks wherein data is read or written. As the disk rotates, a transducer (or "head") is positioned by an actuator to magnetically read data from or write data to the various tracks on the disk. When the disk is rotating at operating speeds, pressure effects caused by air flow between the surface of the disk and an air bearing surface of the head cause the head to float above the disk. In a constant rotation speed disk, these pressure effects can change as the head moves between different radial positions over the disk surface. As a result, the height of the disk head is affected. To maintain optimum device performance, dynamic control of head height is desired.

SUMMARY OF THE INVENTION

In general, in one aspect, the invention features a data storage device that includes a head suspension assembly having an attached airfoil. The airfoil is coupled to an active (i.e., movable) element that responds to signals from height control circuitry. In another aspect, the invention features a method of controlling a height of an air bearing surface. The method includes positioning a suspension assembly having an airfoil and an air bearing disk head over a surface of a rotating data storage disk. A position (i.e., angle) of the airfoil can then be dynamically altered to change a distance of the disk head perpendicular to the surface of the disk.

Implementations may include one or more of the following features. The suspension and airfoil can be parts of a head gimbal assembly. The active element can be a piezoelectric transducer or a solenoid that is attached to the airfoil and suspension assembly and is configured to exert a force between the airfoil and a point on the suspension assembly in response to a signal from the height control circuitry The airfoil can have an edge attached to a planar region of the head suspension assembly and its position can be altered by flexing of the airfoil around an axis formed by the edge. The device can include a flexor attached at a forward end of the suspension assembly and an air bearing slider attached to the flexor. The device can also include a disk-type data storage media coupled to a disk rotating motor, and an actuator coupled to the suspension and operable to move the slider between radial positions of a disk media. The device can include positioning control circuitry that provides a signal to the actuator to control a radial position of the slider with respect to the disk media and provides a signal indicative of the radial position to the height control circuitry. The height control circuitry may regulate the airfoil position in response to the radial position signal. The head suspension assembly can include a magnetic data head. The suspension assembly may include a height sensor that can generate a signal indicative of disk head height. The signal may be generated, e.g., in response to a measured thermal change.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1A:
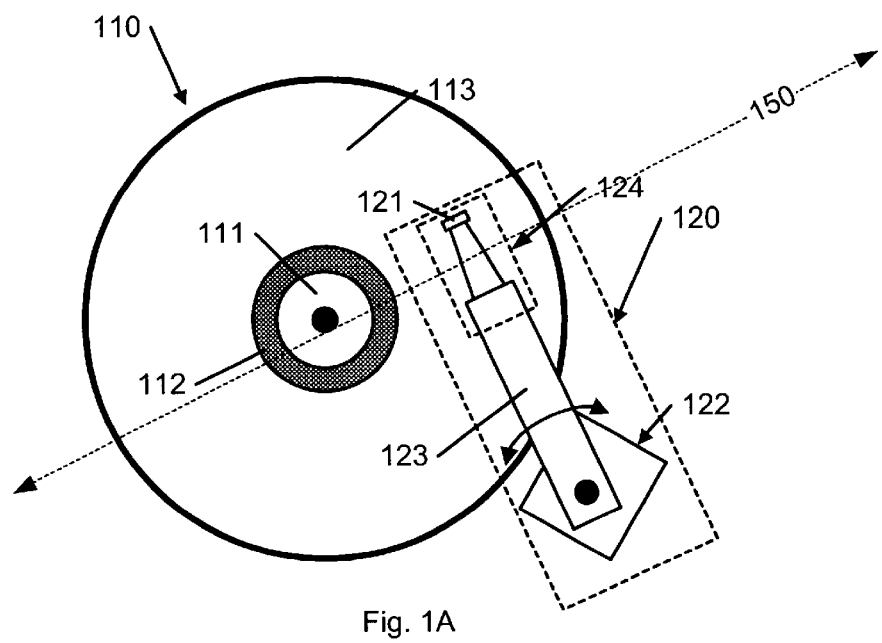
FIGS. 1A and 1B are top view diagrams of a disk drive.
Figure 1B:
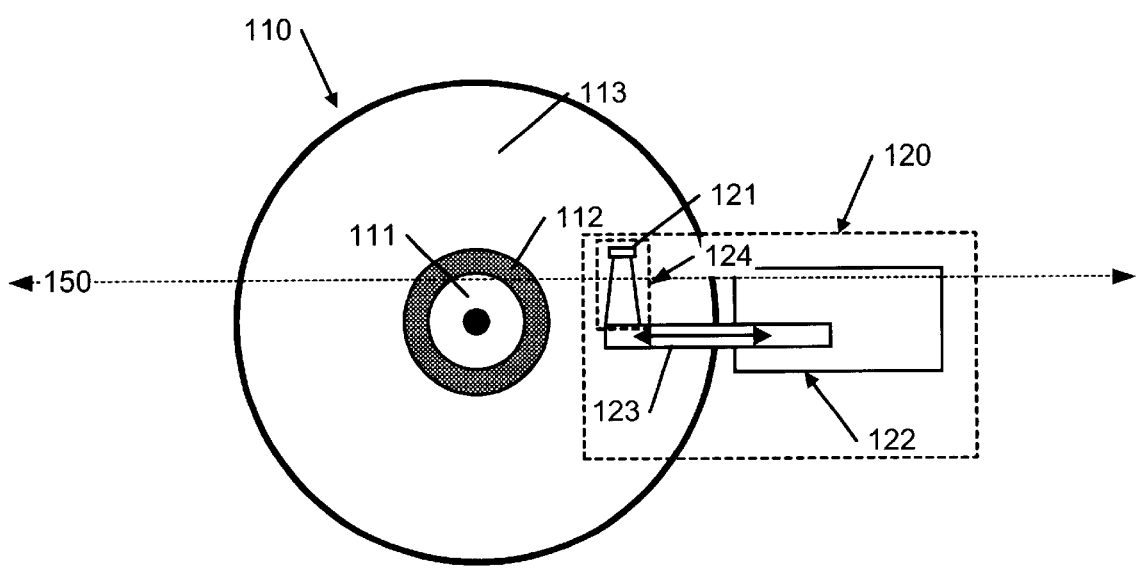
Figure 2:
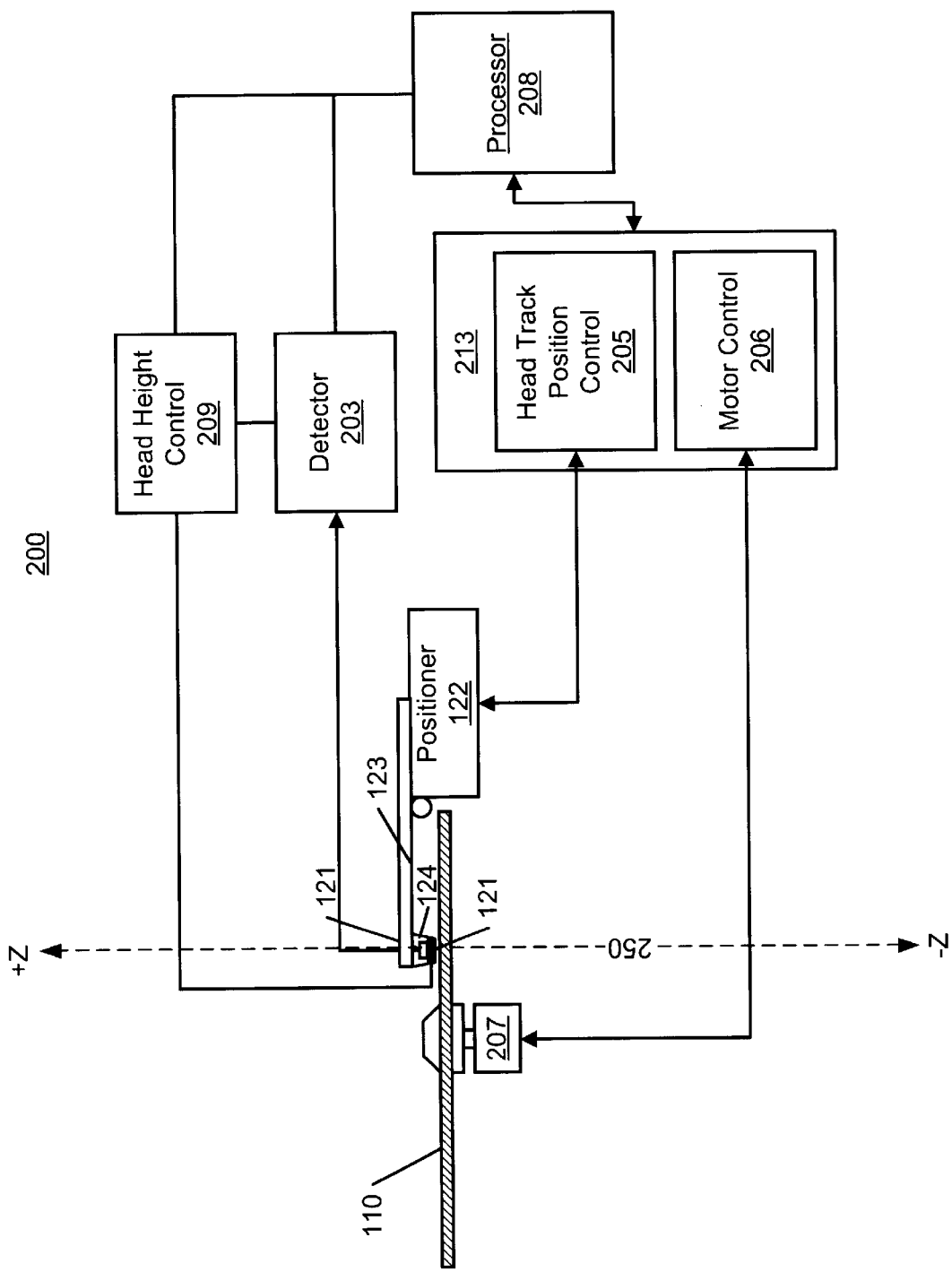
FIG. 2 is a side-view diagram of a disk drive.
Figure 3A:
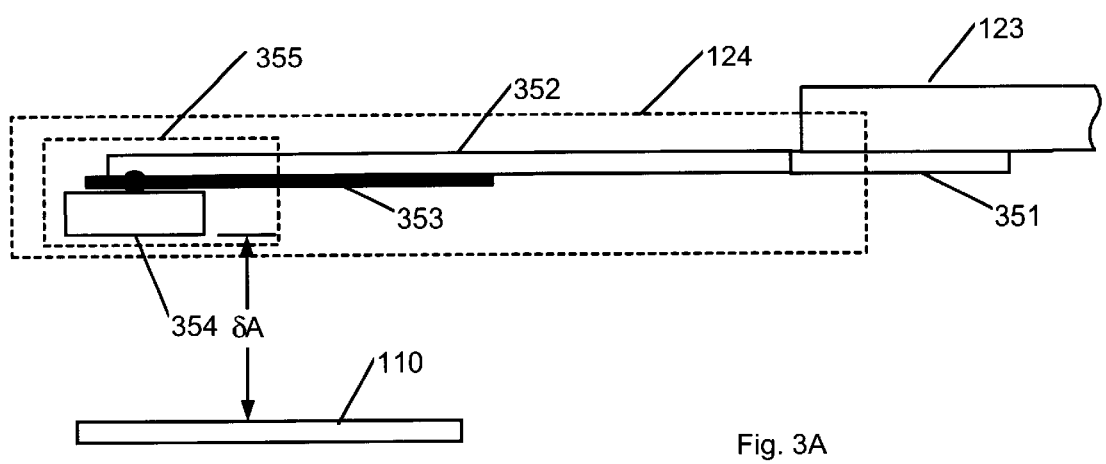
FIG. 3A is a side view of a head gimbal assembly.
Figure 3B:
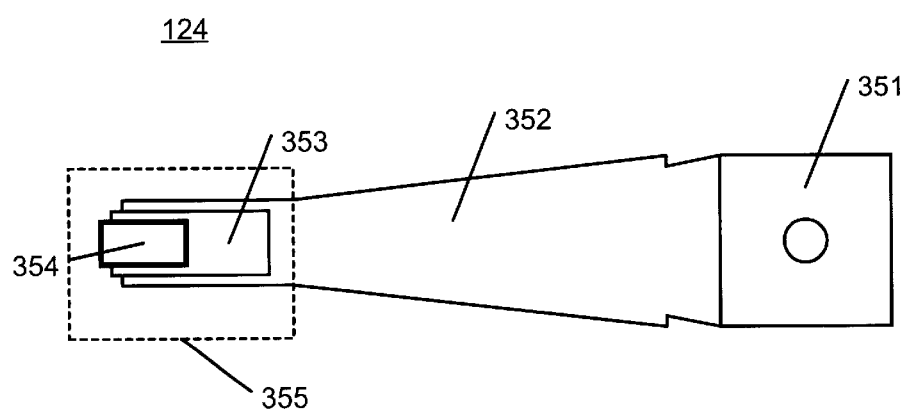
FIG. 3B is a top view of a section of a head gimbal assembly.

FIGS. 1A and 1B each show a top view of a magnetic disk 110 and a disk head assembly 120 for use in a disk drive. FIG. 2 shows a side view of a disk, disk head assembly, and other disk drive components. In FIG. 1A, the assembly 120 includes a rotary head positioning actuator 122 that moves arm 123 and attached head gimbal assembly (HGA) 124. In FIG. 1B the assembly 120 includes a linear head positioning actuator 122 to move arm 123 and HGA 124. FIG. 3A is a detailed view of a HGA as seen looking along axis 150 in FIGS. 1A and 1B. FIG. 3B is a detailed view of the HGA as seen looking from (−Z) to (+Z) along the axis 250 in FIG. 2. The HGA 124 includes a suspension (also known as a load beam) 352 that is attached at one end to a base plate 351 and at the other end to a flexure 353. An air bearing slider 354 is secured to the flexure, typically by means of a gimbal type mounting. HGA 124 can be rigidly attached to the arm 123 at base plate 351 by means of a swaging operation. The slider 354 carries a magnetic sensor (a "head") used to read data from and/or write data to a surface of disk 110. Typically, the slider and accompanying head 354 are biased toward the magnetic surface of a disk 110 by a predetermined bend in the suspension 352 and/or flexure 353.

A typical disk 110 is formed on an aluminum alloy or glass substrate to which various coatings are sequentially applied. Typical coatings include an underlayer of chromium or a chromium alloy, a magnetic layer of cobalt or a cobalt-based alloy, a corrosion protective carbon overcoat, and a lubricant topcoat. A disk 110 may include a center portion 111 where the disk can be attached to a drive motor 207 spindle, a landing zone 112, and a data zone 113. The data zone 113 includes numerous closely spaced concentric tracks where data can be stored. During operation, disk 110 is rotated by the motor 207 at speeds regulated by the motor controller 206 under command from processor 208. The rotation of disk 110 results in pressure effects causing air-bearing slider (and the accompanying head)121 to float above the surface of the disk 110 at a height (δ). As the slider 121 floats above the rotating disk 110, the positioner 122, under control of the processor 208 and control circuitry 205, moves the slider over the disk's data zone 113. Data can then be read from or written to those tracks by the magnetic transducer carried by the slider.

The fly height (δ) of the head and slider 121 is an important parameter affecting, among other things, the density of data that can be read from and written to disk 110, the read and write accuracy of the disk drive, and the reliability and longevity of the drive. The fly height (δ) is affected by, among other things, the aerodynamic characteristics of the HGA assembly and the air flow around the HGA. A mechanism enabling the aerodynamic characteristics of the HGA to be dynamically altered can be used to adjust disk head fly height.

Figure 4A:
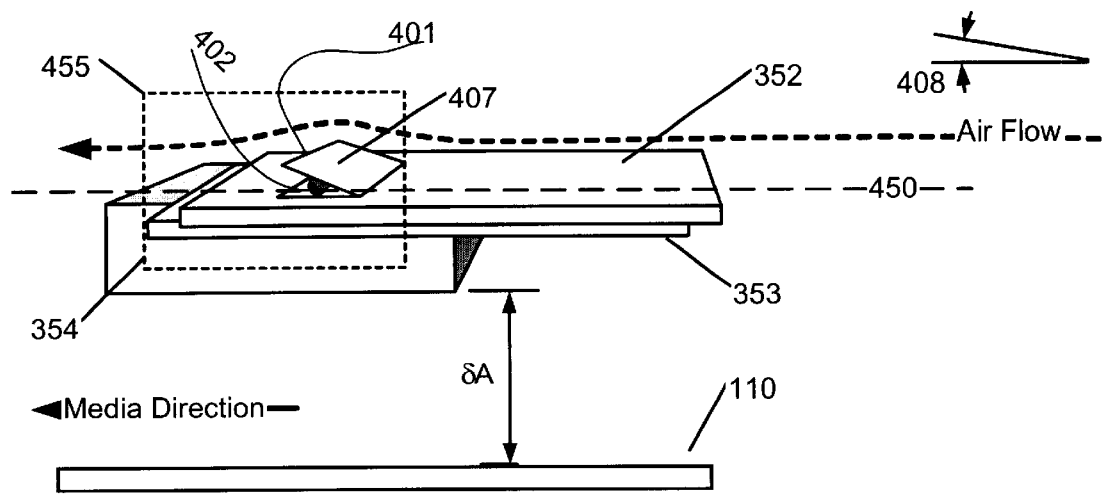
FIGS. 4A, 4B, 4C, 4D, 5A, and 5B each show a section of a head gimbal assembly.
Figure 4B:
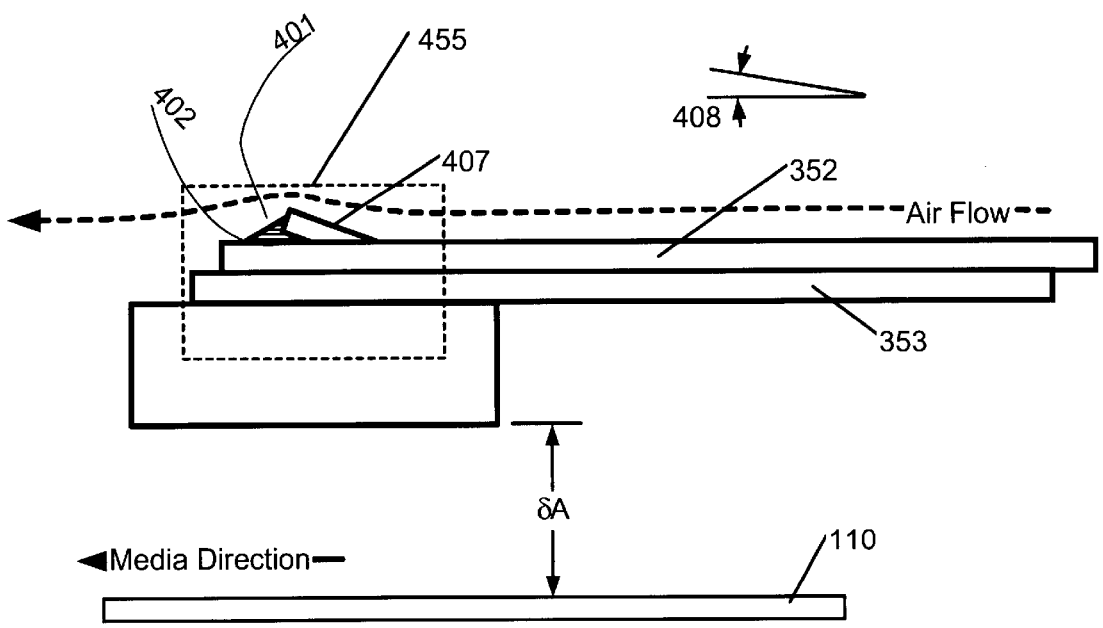
Figure 4C:
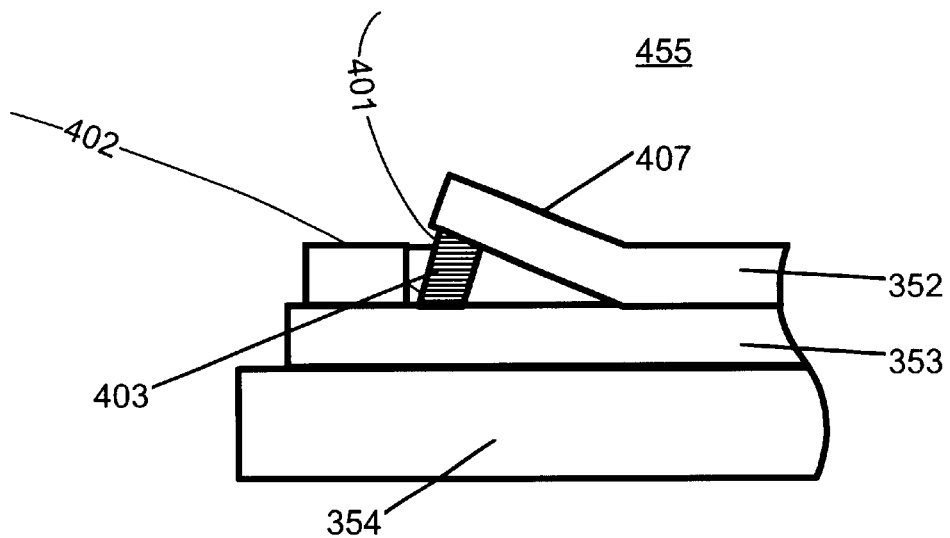
Figure 4D:
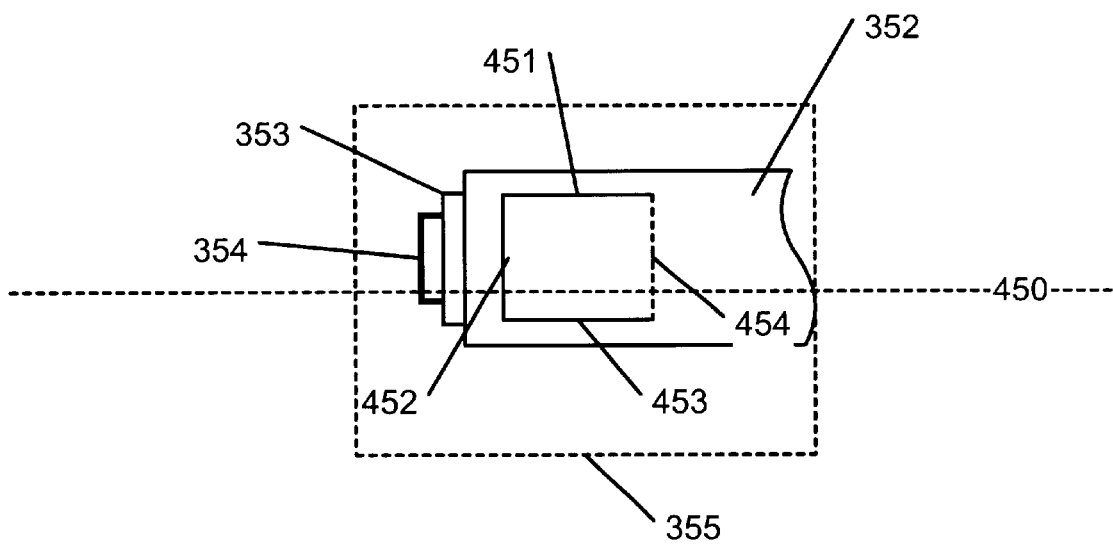

The aerodynamic characteristics of a HGA can be dynamically altered using an adjustable airfoil. FIGS. 4A, 4B, 5A and 5B show a portion 355 of an HGA in which an adjustable airfoil 407 has been formed. FIG. 4C shows an enlarged cross sectional view of section 455 of the HGA along axis 450 (FIGS. 4A, 4D). FIG. 4D shows a view of the HGA as seen looking from (+Z) to (−Z) along axis 250 of FIG. 2. Referring to FIGS. 4C and 4D, the airfoil 407 can be formed as an integral part of the suspension 352 by cutting, stamping, or otherwise forming an area 407 that may be controllably deformed (i.e., bent or flexed) with respect to the surrounding HGA (i.e., suspension) surface along an edge region. For example, a rectangular airfoil can be formed in a planar region of the suspension by cutting or stamping a rectangular section 407 of the suspension along edges 451–453 while leaving another edge 454 of the rectangular section 407 attached to the suspension. The edge 454 thereby forms an axis around which the resulting airfoil can be flexed (i.e., rotated). Of course, non-rectangular shapes can be used and, in some implementations, the airfoil may be a separately fashioned airfoil that is micro-welded, epoxied, or otherwise deformably attached to the suspension. In some implementations, the airfoil can also incorporate a hinge structure to facilitate controlled deformation of the airfoil.

Figure 5A:
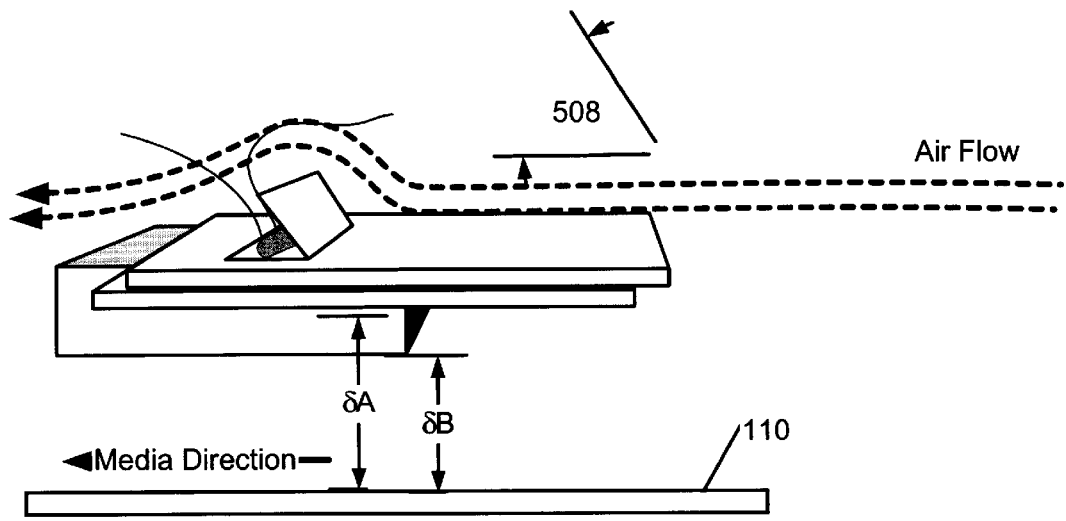
Figure 5B:
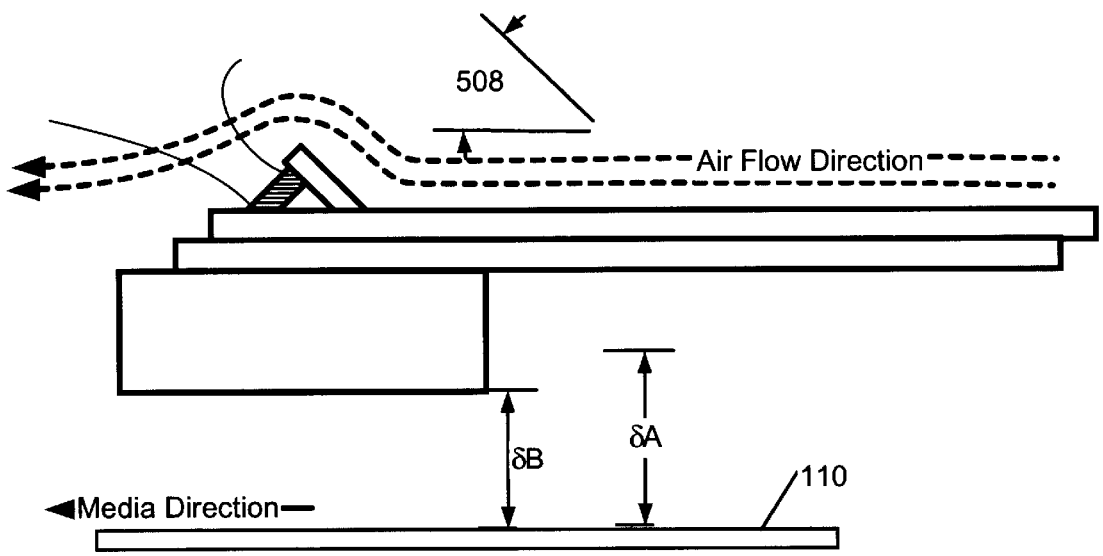

An active element ("a transducer"), such as a sandwich of electrically deformable piezo-electric material or miniature solenoid can be used to dynamically adjust the position of the airfoil 407. FIG. 4C shows an active element 403 placed between the airfoil 407 and flexure 353 in a cutout region of the suspension 352. The cutout region is the vacant area in the plane of the suspension 352 that is formed when the airfoil is deforming along edge 454. The active element 403 may be attached to the airfoil by micro-welding, epoxying, or other attachment technique. The position of the airfoil can be dynamically altered by changing a voltage and/or current applied to contacts 401, 402 of the active element 403. FIGS. 4A and 4B show the airfoil in a first position at an angle 408 with respect to the suspension, while FIGS. 5A, and 5B show the airfoil at an angle 508 that is greater than angle 408. As the angle of the airfoil is changed between the smaller angle 408 and the larger angle 508, aerodynamic forces exerted on the airfoil are changed. Depending on the structure of the HGA, the dominant forces created may be either an upward pressure (a lift force) or a downward pressure. In general, a lift force will be created if the HGA structure is relatively thin such that airflow over a top and bottom surface of the HGA behave similar to airflow over a top and bottom surface of an airplane wing. In such cases, raising the airfoil to a higher angle will generally increase lift raising the slider height. Conventional HGA structures are, however, relatively thick relative to a wing-like structure. In such conventional HGA structures, air pressure exerted on the airfoil creates increasing downward forces as the airfoil is raised to higher angles. This increase in downward force lowers the height of the slider and disk head.

In the discussion that follows, a relatively thick (non-wing-like) HGA is described. As shown in FIGS. 4A and 4B, in a non-wing-like HGA, the slider is at a height $\delta A$ when the airfoil is at an angle 408 of, e.g., thirty-five degrees with respect to the top surface of disk 110, while in FIGS. 5A and 5B the slider is at a reduced height $\delta B$ when the angle of the airfoil is increased to angle 508 of, e.g., forty-five degrees. Change in slider height is related to the downward pressure exerted by the airfoil which, in turn, is related to the air pressure applied to the airfoil. The pressure applied to the airfoil is a function of area of the airfoil with respect to the direction of the airflow. Assuming that the suspension and airflow are substantially parallel to the disk surface, the area of the airfoil with respect to the airflow is a function of the total area of the airfoil multiplied by the sine of the angle of the airfoil. Downward force is a function of the cosine of the angle of the airfoil multiplied by the pressure applied to the airfoil. Thus, downward force is a function of (area of airfoil)(Sin(angle))(Cos(angle)). For a suspension and airflow that are parallel to the surface of the disk, this force approaches its maximum at an angle of forty-five degrees.

As an example, in a 15,000 rotation per minute (rpm) drive at the middle diameter of the data zone 113, the gas velocity, v, is approximately 40 m/s, and the pressure applied to an exemplary airfoil is density ($\rho$) multiplied by the square of the gas velocity ($v^2$). For air, density is approximately $\rho=1$ kg/m$^3$, giving $\rho\mu^2$ of approximately 1600 Pascal. If the total area of the airfoil is 20 mm$^2$, then at an angle of thirty-five degrees to the suspension, the downward force is approximately (1600 pascals)(20 mm$^2$)(Sin(35))(Cos(35))=1.50 gram force (grmf). If the angle were changed to forty-five degrees, the new downward force would be (1600) (20 mm$^2$)(Sin(45))(Cos(45))=1.6 gram force (grmf). This results in a difference of approximately 0.1 grmf. In an HGA having a preload sensitivity of −0.2 microinches/grmf, this 0.1 grmf difference would decrease the fly height of the head by 0.02 microinches.

Referring back to FIG. 2, a disk drive may contain height control circuitry 209 to control the force exerted by the active element 407 and, correspondingly, to control the deformation of the airfoil and the height of the slider/disk head. The control circuitry 209 may adjust the height based on the liner velocity of the disk surface 110 with respect to the slider. In a disk drive in which the disk media rotates at a constant rotation speed (i.e., at a constant angular velocity), the linear velocity of a disk surface at a particular radial point (r) increases as the radius (r) increases. Thus, the linear velocity of the disk is lower at radial points approaching the landing zone 112 of the disk and is higher at radial points approaching the outer edge of the disk. Correspondingly, gas velocity (i.e., air flow velocity) with respect to the slider increases as the slider moves from a lower to a higher radius with respect to the center of rotation of the disk 10. This changes the air bearing forces exerted on the HGA and can affect slider/head height.

Referring back to FIG. 2, a disk drive can include control circuitry 209 that controls the position (i.e., angle) of the airfoil 407 to regulate head height. The control circuitry 209 may control the airfoil position based on the radial position of the HGA and/or based on sensor readings indicative of slider height. Position-based control circuitry can include predetermined or dynamically calculated control values. For example, the control circuitry, may store a table containing different airfoil position values that are associated with different radial positions of the slider. As the actuator 122 and control circuitry 205 moves the slider, position information is communicated to the control 209 which, in turn, modulates a control signal to position the active element 403. The airfoil position values may be empirically determined. In other implementations, the control circuitry 209 may dynamically calculate an airfoil position based on gas velocity and radial position of the head.

In some implementations, control circuitry 209 may control airfoil position based on a signal from a height sensor that is processed by a detector 203. The height sensor may be a read head and the detector 203 may determine the head height based on the strength of the read data. In such an implementation, a stronger read data signal may indicate lower head positions. Implementations can also determine height based on thermal effects associated with head height.

A thermal-based height sensor can be formed using magnetoresistive (MR) read head technology. A MR head typically consists of a read element located in a space between two highly-permeable magnetic shields. The shields focus magnetic energy from the disc and reject stray fields and stray magnetic energy from the disk. The read element in a MR head is typically made from a ferromagnetic alloy whose resistance changes as a function of an applied magnetic field and the temperature of the read element.

The temperature of the read element is affected by the distance between the slider 121 and the surface of the disk 110. During operation, current passing through the read element at the slider 121 results in heat generation. With respect to the head on slider 121, the surface of the disk 110 acts as a heat sink. Dissipation of heat between the head and the surface of the disk is affected by the distance between the head/slider and disk surface. As the head/slider moves closer to the surface of the disk, the rate of heat dissipation increases. As the rate of heat dissipation increases, the resistance of the head decreases and the voltage seen at the head decreases. Correspondingly, as the head to disk spacing increases, heat dissipation decreases and the voltage seen at the head increases. The various resistance changes and voltage changes detected at detector 203 that are caused by heating and cooling of the head can be used to determine the height of the head. For example, the detector 203 may analyze the rate, duration, and magnitude of voltage changes within a predetermined time period or as an average of the absolute magnitude to estimate head height.

To simplify the detection of thermal changes, it may be desirable to isolate thermally induced resistance changes from those caused by magnetic flux from the disk. To do so, thermal detection may be provided by an independent thermal sensor with a reduced sensitivity to magnetic fields. Such a thermal sensor may be produced using MR head technology to fashion a "read" sensor with a reduced response to magnetic flux. To reduce the read sensor's response to magnetic flux while retaining thermal response characteristics, the magnetically responsive read element alloy components can be reduced. For example, in a MR head having a nickel-iron alloy read element, the iron content in the read element can be reduced or eliminated thereby reducing or eliminating the head's sensitivity to magnetic flux. This resulting head retains thermal asperity sensing properties, but has little or no sensitivity to magnetic signals.

In the system 200, the signal output at the height sensor acts as an input to height detection circuitry 203. Each height sensor reading may be independently processed to produce an airfoil control signal, or data from the height sensor may be processed using a weighted sequence of sensor readings. By using a sequence of sensor readings, rather than a single current reading, errors introduced by signal noise and minor disk surface aberrations (bumps or pits) can be reduced. An exemplary height control algorithm that uses a weighed series of P sensor readings follows (where P is the number of sensor readings). The algorithm can be implemented in custom hardware or can be software implemented using a general or special purpose programmable processor.

In the example that follows, height sensor values are in the range (−1) to (+1) where the value zero is the desired (target) height.

1) At time n, store a vector $H_n$ containing the previous P samples $H[n-1], H[n-2], \ldots H[n-P]$ from the height sensor. Additionally, store a P element weight vector $W_n$ such that:
a) $H_n = \{H[n-1], H[n-2], \ldots H[n-P]\}$, wherein for k<0, $H[k]=0$; and
b) $W_n = \{W[1], W[2], \ldots W[P]\}$ is a vector storing a sequence of P tap values.
These tap values may be experimentally determined.

2) For a received head height sensor sample H[n], compute the predicted head height $H_{est}[n]$ $$H_{est}[n] = W_n \cdot H_n^T,$$

where $W_n \cdot H_n^T$ is the dot-product of the vectors $H_n$ and the transverse of vector $W_n$.

3) Compare the predicted head height $H_{est}[n]$ to a target head height $H_{target}=0$.

4) If $H_{est}[n]$ is a positive value (indicating the head height is too great) change the airfoil position to decrease head height; if $H_{est}[n]$ is a negative value (indicating the head height is too low), change the airfoil position to increase head height. Changing the airfoil position may includes modulating a signal to the transducer 307 based on the magnitude of the difference between the predicted and target head height.

In some implementations, an adaptive weight vector $W_n$ can be used. In an adaptive implementation, an error signal E[n] may be computed as a difference between a current, a previous and a target head height. For example, over-correction of a previously low head height may be indicated if an airfoil adjustment results in a current head height that is too high. Incidents of over-correction may be reduced by, e.g., reducing the magnitude of weighing vector elements. On the other hand, under-correction of a previously low head height may be indicated by a current head height that remains too low. Under-correction may be reduced by increasing the magnitude of weighing vector elements.

A number of embodiments of the present invention have been described. Nevertheless, it will be understood that various modifications may be made without departing from the spirit and scope of the invention. For example, non-rectangular airfoils can be used, the airfoil may be located at other points on a HGA or suspension, the airfoil may be set at a fixed angle and not require an active element. Accordingly, other embodiments are within the scope of the following claims.

What is claimed is:

1. A head suspension assembly comprising:
a loadbeam;
an airfoil attached to the loadbeam; and
a piezo-electric active element coupled to the airfoil and to height control circuitry and configured to alter a position of the airfoil in response to signal from height control circuitry.

2. The head suspension assembly of claim 1 wherein the airfoil comprises an edge attached to a planar region of the loadbeam; and
altering a position of the airfoil comprises flexing the airfoil around an axis formed by the edge.

3. The head suspension assembly of claim 2 further comprising a flexor attached at a forward end of the loadbeam and a slider attached to the flexor.

4. The head suspension assembly of claim 3 further comprising:
a disk media coupled to a disk media rotating motor; and
an actuator coupled to the loadbeam and operable to move the slider between radial positions of the disk media.

5. The head suspension assembly of claim 4 wherein the disk media comprises a data zone and the device further comprises positioning control circuitry operatively coupled to the height control circuitry and to the actuator, the positioning control circuitry being configured to provide a signal to the actuator to control a radial position of the slider with respect to the disk media and to provide a signal indicative of the radial position to the height control circuitry.

6. The head suspension assembly of claim 3 herein the slider further comprises a magnetic data head and the device further comprising positioning circuitry operatively coupled to an actuator coupled to the loadbeam, the positioning circuitry being configured to provide a signal to the actuator to control a radial position of the head with respect to a surface of a disk media.

7. The head suspension assembly of claim 6 wherein the height control circuitry is operatively coupled to a position control circuitry and is configured to regulate a height of the magnetic data head perpendicular to the surface of the disk media.

8. The head suspension assembly of claim 1 wherein the loadbeam comprises a height sensor operatively coupled to the height control circuitry.

9. The data head suspension assembly of claim 8 wherein the height sensor comprises a sensing element configured to generate a signal in response to a height sensor thermal change indicative of a distance perpendicular to a surface of a disk media.

10. The head suspension assembly of claim 1 wherein the piezo-electric active element is configured to exert a force between the airfoil and a point on the loadbeam in response to an electrical signal applied to the active element by the height control circuitry.

11. A method of controlling a height of an air bearing surface comprising:

positioning a loadbeam comprising an airfoil and a slider over a surface of a rotating data storage disk; and dynamically altering a position of the airfoil to change a distance of the slider relative to the surface wherein dynamically altering a position of the airfoil comprises altering an electrical signal applied to a piezo-electric active element.

12. The method of claim 11 wherein positioning the loadbeam comprises moving the slider between a first and second disk surface radial positions.

13. The method of claim 11 wherein the loadbeam further comprises a slider comprising a height sensor, further wherein the height sensor and the piezo-electric active element are configured to alter a deformation force applied to the airfoil in response to an airfoil position signal for height control circuitry.

14. The method of claim 13 wherein the method further comprises receiving at the height control circuitry from the height sensor a height signal indicative of a change in a distance of the height sensor perpendicular to a surface of the rotating data storage disk.

15. The method of claim 13 wherein dynamically altering comprises altering the airfoil position signal in response to a height signal received at the height control circuitry.

16. The method of claim 11 wherein altering a position of the airfoil comprises flexing the airfoil around an axis comprising an attachment between the airfoil and the loadbeam.

17. A disk drive apparatus comprising:

an actuator to position a head-gimbal assembly comprising a loadbeam positioned over a surface of a magnetic data storage disk;

movable airfoil means for actively changing a data transfer head height, wherein the movable airfoil means is positioned on the loadbeam; and a piezo-electric active element, the piezoelectric active element being coupled to the movable airfoil.

18. The head suspension assembly of claim 6 wherein the loadbeam has a distal and proximal end with the magnetic data head and the airfoil operatively attached nearer to the distal end of the loadbeam and the actuator operatively coupled nearer to the proximal end of the loadbeam.

19. A head suspension assembly comprising:

a loadbeam having a relatively planar surface; and a piezo-electric active element positioned on the load beam, wherein the piezo-electric active element deforms the relatively planar surface to control an aerodynamic force on the load beam.

20. The head suspension assembly of claim 19 wherein the airfoil comprises an edge attached to the loadbeam and the piezo-electric active element is positioned such that it deforms the airfoil around an axis formed by the edge.

21. The head suspension assembly of claim 20 further comprising a flexor attached at a forward end of the loadbeam and a slider attached to the flexor.

22. The head suspension assembly of claim 21 further comprising:

a disk media coupled to a disk media rotating motor; and an actuator coupled to the loadbeam and operable to move the slider between a plurality of radial positions of a the disk media.

23. The head suspension assembly of claim 21 further comprising positioning circuitry operatively coupled to an actuator coupled to the loadbeam, the positioning circuitry being configured to provide a signal to the actuator to control a radial position of the slider with respect to a surface of a disk media.

24. The head suspension assembly of claim 19 wherein the loadbeam comprises a height sensor operatively coupled to the control circuitry.

25. The head suspension assembly of claim 24 wherein the height sensor comprises a sensing element configured to generate a signal in response to a height sensor thermal change indicative of a distance perpendicular to a surface of a disk media.

26. The head suspension assembly of claim 19 wherein the active element is configured to exert a force between the airfoil and a point on the loadbeam in response to an electrical signal applied to the active element by the height control circuitry.

* * * * *